United States Patent [19]

Chang

[11] Patent Number: 4,525,568
[45] Date of Patent: Jun. 25, 1985

[54] STORAGE STABLE, ONE-PACKAGE HEAT CURABLE POLYURETHANE ADHESIVE COMPOSITIONS

[75] Inventor: Eugene Y. C. Chang, Bridgewater, N.J.

[73] Assignee: American Cyanamid Company, Stamford, Conn.

[21] Appl. No.: 586,885

[22] Filed: Mar. 9, 1984

[51] Int. Cl.³ .............................................. C08G 18/72
[52] U.S. Cl. ................... 528/60; 156/331.4; 427/385.5; 428/423.1; 528/77; 528/81; 528/84; 528/85
[58] Field of Search ...................... 528/60, 77, 81, 84, 528/85; 156/331.4; 427/385.5; 428/423.1

[56] References Cited

U.S. PATENT DOCUMENTS 4,390,678 6/1983 La Belle et al. ...................... 528/60
4,400,498 8/1983 Konishi et al. ....................... 528/65
4,420,600 12/1983 Zavisza ................................ 502/170

Primary Examiner—Maurice J. Welsh
Attorney, Agent, or Firm—Gordon L. Hart

[57] ABSTRACT

New and improved storage stable, one package, heat curable polyurethane adhesive compositions are disclosed which comprise:

(a) a mixture of or a prepolymer adduct of:
  (i) an excess of a poly aliphatic isocyanate compound of the formula:

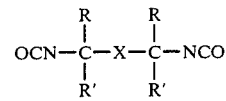

wherein R and R' are each, independently, hydrogen, alkyl or substituted alkyl and X is a bridging means selected from divalent aliphatic, cycloaliphatic or aromatic groups; and
  (ii) at least one monomeric or polymeric compound containing a plurality of hydroxyl groups; in admixture with (b) a stoichiometric amount of a curing agent comprising a monomeric or polymeric compound having at least three hydroxyl groups at least one of which is a secondary hydroxyl group; and (c) optionally, an inert filler.

The compositions are curable upon exposure to elevated temperatures of from about 100°–200° C. to form high tensile strength, high adhesive strength bonds to a variety of substrates. The compositions have extended pot lives of up to six weeks and exhibit storage stability for up to six months.

12 Claims, No Drawings

STORAGE STABLE, ONE-PACKAGE HEAT CURABLE POLYURETHANE ADHESIVE COMPOSITIONS

BACKGROUND OF THE INVENTION

The present invention relates to new and improved polyurethane adhesive compositions. More particularly, it relates to one package polyurethane adhesives based upon poly aliphatic isocyanate compounds which are storage stable for prolonged periods of time and which are curable by heat to form high bond strength adhesive joints which exhibit excellent adhesion to a variety of substrates.

In this application, the term "aromatic isocyanate" refers to an organic isocyanate compound wherein the isocyanate group(s) is bonded directly to a carbon atom of an aromatic nucleus. By "aliphatic isocyanate" is meant an organic isocyanate compound wherein the isocyanate group or groups are bonded directly to an aliphatic carbon atom. By "polyaliphatic isocyanate" is meant an aliphatic isocyanate having more than one such isocyanate bonded to aliphatic carbon atoms in the molecule.

Polyurethane adhesives are widely used for bonding various metallic, plastic and glass substrates because they form good adhesive bonds with these substrates. Generally, prior art polyurethane adhesive compositions comprise two component systems in which a diisocyanate-containing component and a polyol containing component are properly measured and mixed immediately prior to applying the adhesive to the substrate. These compositions have extremely rapid gellation times upon standing at room temperature of a few minutes to a few hours. After gellation, the compositions cannot be further used as adhesives because they are difficult, if not impossible to apply and do not bond satisfactorily to substrates.

In U.S. Pat. No. 4,119,594, thermosetting polyurethane compositions having improved pot lives useful for forming injection molded articles are disclosed. These compositions comprise diphenylmethane diisocyanate or a liquid isocyanate-terminated reaction product of diphenylmethane diisocyanate and a diol; about 40 to 85 equivalents of hydroquinone di-(beta-hydroxyethyl) ether, a liquid polyol having hydroxy functionality of greater than two and an equivalent weight of about 2,000 and a catalytic amount of zinc stearate, said composition having an excess of isocyanate groups over hydroxyl groups of up to 10%. The compositions are described as stable at room temperature for up to several hours and cure upon injection molding at temperatures of from about 120° to 170° C. to form satisfactory molded articles.

It has now been discovered that one package heat curable polyurethane adhesive compositions exhibiting good long-term storage stability in a closed container and useful pot lives at room temperature of up to about six months are provided by a mixture or a prepolymer solution of secondary or tertiary polyaliphatic isocyanate compounds and a stoichiometric amount of a diol, polyol, or a mixture of diols and polyols. The adhesive compositions upon heat curing form strong adhesive bonds or joints for a variety of substrates and the inconveniences associated with the measuring, mixing and use of the prior art two-component systems are avoided.

SUMMARY OF THE INVENTION

In accordance with the present invention, new and improved storage stable, one package, heat curable polyurethane adhesive compositions are provided in the form of compositions comprising:

(a) a mixture of or a prepolymer adduct of:

(i) a poly aliphatic isocyanate compound having the formula:

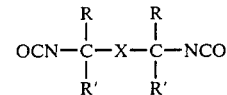

wherein R and R' are each, independently, selected from hydrogen, alkyl or substituted alkyl and X is a bridging means selected from aliphatic, cycloaliphatic or aromatic groups; and (ii) a monomeric or polymeric compound containing a plurality of hydroxyl groups, wherein component (ii) is added in an amount so as to provide less than a stoichiometric hydroxyl equivalent to the aliphatic isocyanate equivalents in (a)(i), preferably in an amount such that component (a) possesses an overall stoichiometric excess of poly aliphatic isocyanate groups over hydroxyl groups of about 5% to about 15% by weight of the total polyaliphatic isocyanate content of (a)(i); in admixture with (b) a curing agent comprising a monomeric or polymeric compound containing at least three hydroxyl groups, at least one of said hydroxyl groups being a secondary hydroxyl group and preferably not more than two of said hydroxyl groups being primary hydroxyl groups, said curing agent being present in an amount to provide sufficient additional hydroxyl groups to provide a stoichiometrically equivalent amount of hydroxyl groups to the stoichiometric excess of aliphatic isocyanate equivalents present in Component (a); and (c) optionally, an inert filler.

In preferred embodiments, the new and improved adhesive compositions of the present invention may comprise:

(a) a mixture of or a prepolymer adduct of (i) α, α, α, α'-tetramethylxylylene diisocyanate; and (ii) less than a stoichiometric equivalent amount of a hydroxyl-terminated polyester having a molecular weight of from about 100 to about 2000; in admixture with (b) a curing agent selected from the group consisting of glycerol, 1,2,6-hexanetriol, and polyol compounds containing at least one secondary hydroxyl group; and (c) from about 10 to about 60 parts by weight, based upon 100 parts by weight of (a) and (b) combined, of a fumed colloidal silica filler.

In accordance with another aspect of the present invention, a new and improved method for preparing a storage stable, one package, heat-curable polyurethane adhesive composition is provided, said method comprising (a) forming a liquid mixture of a poly aliphatic isocyanate compound of the formula:

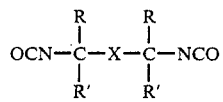

wherein R and R' are each, independently, selected from hydrogen, alkyl and subtituted alkyl and X is a bridging means selected from divalent aliphatic, cycloaliphatic and aromatic groups, or a prepolymer adduct of said isocyanate possessing polyisocyanate functionality in a suitable solvent;

(b) adding to (a), a liquid mixture of at least one monomeric or polymeric compound containing a plurality of hydroxyl groups, optionally in a suitable solvent, in an amount so as to provide less than a stoichiometrically equivalent amount of hydroxyl groups to the isocyanate groups present in (a) to provide a mixture or prepolymer containing from about 5% to about 15% by weight of a stoichiometric excess aliphatic isocyanate equivalents over hydroxyl equivalents in the liquid mixture;

(c) thereafter, adding a curing agent comprising a monomeric or polymeric compound containing at least three hydroxyl groups, at least one of which is a secondary hydroxyl group, in an amount sufficient to provide an approximately stoichiometrically equivalent amount of hydroxyl groups to said excess of aliphatic isocyanate groups in the liquid mixture of step (b); and (d) optionally, adding an effective amount of an inert filler to obtain a storage stable one package heat curable polyurethane adhesive composition.

In accordance with a further aspect of the present invention, there are provided new and improved articles of manufacture comprising a plurality of work pieces having at least a part of a surface portion of one work piece in close proximity to another workpiece and having an adhesive joint therebetween being formed of cured polyurethane composition as defined above, as well as a method for bonding articles to produce such articles of manufacture.

Other objects and advantages of the present invention will become apparent from the following detailed description of the invention in conjunction with the illustrative working examples.

DETAILED DESCRIPTION OF THE INVENTION

In accordance with these and other objects, the present invention firstly comprises as component (a) a mixture of, or a prepolymer adduct formed by reaction of:
(i) a poly aliphatic isocyanate compound; and
(ii) at least one monomeric or polymeric compound containing a plurality of hydroxyl groups.

The aliphatic polyisocyanate compounds for use herein as component (a)(i) may be monomeric or polymeric compounds having a plurality of aliphatic isocyanate terminal groups. More particularly, component (a)(i) may comprise at least one poly aliphatic isocyanate compound of the formula:

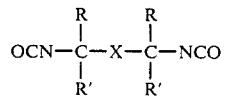

wherein R and R' are each, independently, selected from hydrogen, alkyl and substituted alkyl and X is a bridging means selected from divalent aliphatic, cycloaliphatic, and aromatic groups.

Examples of poly aliphatic isocyanate compounds for use in the adhesive compositions of this invention include:
α, α, α', α'-tetramethyl-1-3-xylylene diisocyanate,
α, α, α', α'-tetramethyl-1,4-xylylene diisocyanate,
methylenebis(4-cyclohexylisocyanate),
isophorone diisocyanate,
1,4-cyclohexylene diisocyanate, and the like.

The especially preferred diisocyanate is α, α, α', α'-tetramethyl-1,3-xylylene diisocyanate, hereinafter referred to as TMXDI.

In addition to the above described monomeric aliphatic isocyanate compounds, polymeric materials derived in part from these aliphatic isocyanates and possessing terminal aliphatic isocyanate groups may also be used as component (a)(i). The polymeric materials containing aliphatic isocyanate terminal groups are polymeric adducts or urethane precursors, formed by reacting an excess of poly aliphatic diisocyanate compound, generally 1 molar equivalent, with a polyol compound, generally 0.3 to about 0.7 molar equivalents, optionally in a suitable solvent, at temperatures of about 70°–80° C. for several hours, although if a catalyst is used, such as an organic tin catalyst, in an amount of from about 0.01 to 0.1 percent by weight, reaction times may be considerably reduced.

Suitable polyols which may be reacted with the polyaliphatic isocyanate compounds to form isocyanate terminated urethane precursors include: monomeric polyols such as ethylene glycol, propylene glycol, diethylene glycol, triethylene glycol, dipropylene glycol, trimethylene glycol, and 1,3- and 1,4- butanediol.

Polyether polyols, which are obtained by effecting addition of one type, or two types or more, among, for example, ethylene oxide, propylene oxide, butylene oxide, tetrahydrofuran, and styrene oxide, with for example, water, ethylene glycol, propylene glycol, diethylene glycol, triethylene glycol, dipropylene glycol, trimethylene glycol, 1,3- and 1,4- butanediol, 1,5-pentanediol, 1,2-hexylene glycol, 1,10-decanediol, 1,2-cyclohexanediol, 2-butene-1,4-diol, 3-cyclohexane-1,1-dimethanol, 4-methyl-3-cyclohexane-1,1-dimethanol, 3-methylene-1,5-pentanediol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-pentanediol, (4,4-pentyloxy-methyl)-1,3-propanediol, 3-(o-propenylphenoxy)-1,2-propanediol, 2,2'-diisopropylidenebis (p-phenyleneoxy) diethanol, glycerin, 1,2,6-hexanetriol, 1,1,1-trimethyloethane,1,1,1-trimethylolpropane, 3-(2-hydroxyethoxy)-1,2-propanediol, 3-(2-hydroxypropyl)-1,2-propanediol, 2,4-dimethyl-2-(2-hydroxyethoxy)-methylpentanediol-1,1,1,1-tris ((2-hydroxyethoxy)methyl)-ethane, 1,1,1-tris ((2-hydroxypropoxy) methyl) propane, pentaerythritol, sorbitol, sucrose, lactose, α-methyl glucoside, α-hydroxyalkyl glucosides, novolak resin, phosphoric acid, benzenephosphoric acid, polyphosphoric acid (such as tripolyphosphoric acid and tetrapolyphosphoric acid), and caprolactone may also be employed.

Polyester polyols formed from one type, or two types or more, among compounds which possess at least two hydroxy groups, such as polytetramethylene ether glycol, also ethylene glycol, diethylene glycol, triethylene glycol, 1,2-propylene glycol, dipropylene glycol, trimethylene glycol, 1,3- and 1,4- butanediol, tetramethylene glycol, neopentyl glycol, hexamethylene glycol, decamethylene glycol, glycerin, trimethylolpropane, hexanetriol, pentaerythritol, and sorbitol, and one type, or two types or more, among compounds which possess at least two carboxyl groups, such as malonic acid, maleic acid, succinic acid, adipic acid, tartaric acid, pimelic acid, sebacic acid, oxalic acid, phthalic acid, terephthalic acid, hexahydrophthalic acid, aconitic acid, trimellitic acid, and hemimellitic acid can also be used.

Also ring-opened polymers of cyclic esters as polycaprolactone; and furthermore, there are so-called polymer polyol compositions among polyether polyols and/or polyester polyols such as the commercially available polyols sold under the tradename NIAX ® from UNION CARBIDE Corporation, and also polyols which can be obtained by polymerizing ethylenically unsaturated compounds, such as acrylonitrile, styrene, α-methylstyrene and methylmethacrylate in a polyether or polyester polyol. One can further use, for example, 1,2-polybutadiene glycol, 1,4-polybutadiene glycol, polyhydroxy polyacrylate, and epoxy resins.

The polymeric isocyanate-terminated urethane precursors may be used alone with a secondary hydroxyl-containing curing agent to form the adhesive compositions of this invention or they may be further reacted with still another monomeric or polymeric compound containing hydroxyl groups as component (a)(ii). The useful prepolymer adducts should not be gelled and should be soluble in the solvents used.

Component (a)(ii) may comprise any of the polyhydroxy compounds described above for forming the polymeric urethane precursors for use as component (a)(i). In this way, for example, a polyether adduct may be further reacted with a polyester polyol or polycaprolactone to incorporate desired end properties to the polyurethane adhesive, such as for example, increased flexibility or elastomeric properties.

Curing agent, component (b), may comprise any monomeric or polymeric compound possessing at least three hydroxyl groups, at least one of which comprises a secondary hydroxyl group and preferably not more than two of said hydroxyl groups are primary hydroxy. Illustrative curing agents for use in the adhesive compositions of the present invention include glycerol, 1,2,6-hexanetriol, or polymeric polyols containing secondary hydroxy groups or polyesters derived from secondary hydroxy polyols. Illustrative polymeric polyols which are presently commercially available, are sold under the tradenames NIAX ® LHT 240 and NIAX ® LS 490, both available from Union Carbide Corporation.

Components (a)(i), (a)(ii) and (b) may optionally be mixed or reacted in a suitable solvent.

As used herein, the term "suitable solvent" is defined as a solvent which is relatively inert to the reactants. Suitable solvents include N,N-dimethylformamide, N,N-dimethylacetamide, N,N-dimethylpropionamide, tetrahydrofuran, dimethyl sulfoxide, toluene, and mixtures thereof. A preferred solvent is N,N-dimethylformamide. When a solvent is not required, it is generally preferred not to use one.

Optionally, the adhesive compositions of the subject invention may additionally contain an inert filler added as a thickener or thixotrope or to obtain a desired paste-like consistency. Suitable inert fillers which may be added for this purpose are talc, clay, titanium dioxide, lithopone, zinc oxide, zirconium silicate, silica aerogel, iron dioxide, diatomaceous earth, calcium carbonate, fumed silica, silazane treated silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc.

Fumed colloidal silica is a preferred filler for use herein. Generally, a filler may be added in an amount ranging from about 10 to about 700 parts by weight, based upon the combined weight of (a) and (b). Typically however, the filler or fillers are added in amounts of from about 10 to about 60 parts by weight, based upon the combined weight of (a) and (b).

The new and improved storage stable, one-package, heat curable polyurethane adhesive compositions are simply prepared by mixing each of the components at room temperature to form a heat curable paste composition. In a preferred method, after the components have been thoroughly admixed, the composition is degassed by heating the composition at a temperature of about 70° C. to about 100° C. under vacuum. The degassed composition may thereafter be stored in a closed container in the absence of atmospheric moisture at room temperature for a period up to about six months.

The new and improved adhesive compositions of the subject invention may be applied to a plurality of workpieces to be adhesively bonded by any suitable means depending on the consistency of the composition, such as for example by brushing, spraying or trowelling. Thereafter, when the workpieces are brought into close proximity so as to form a sandwich structure adhesive joint therebetween, and are heated, the composition cures to form a solid firmly adhered adhesive joint exhibiting excellent tensile strength and bonding strength. Generally, the compositions of the present invention will be satisfactorily cured by heating the adhesive composition and the substrate(s) to a temperature of about 100° to about 200° C. for a period of from about 1 to 60 minutes. Preferably, the adhesive compositions of the subject invention and adhesive joints comprising same are cured at from about 125°-155° C. for about 3 to about 30 minutes. Actual curing times may vary depending temperature, shape of the materials, used and the heat transfer media employed. Prior to heating, the compositions of this invention exhibit excellent work lives and generally will not gel at room temperature for as long as about six weeks.

In order that those skilled in the art may better understand how the present invention may be practiced, the following Examples are provided by way of illustration and not by way of limitation.

DESCRIPTION OF THE PREFERRED EMBODIMENTS

EXAMPLE 1

A paste was prepared by mixing, at room temperature, 2.34 grams (0.0033 mole) of trifunctional polypropylene glycol (NIAX ®LHT240), 4.6 grams (0.04 equivalent) of another trifunctional polyether (NIAX ® LS490), 1.0 gram of a thickening agent (CABOSIL ®N 70 TS; Cabot Corporation), and 6.5 grams (0.025 mole) of methylenebis(4-cyclohexylisocyanate) (DESMODUR ®W; Mobay). In this mixture NIAX ®LHT240 and LS490 provide 20% and 80%, respectively, of the stoichiometric amount of hydroxyl needed to react with the isocyanate groups. This mixture was storage-stable at room temperature for about four months.

The paste was applied to two cold-rolled steel laps (1"×5"), with an overlap of one inch, using a fine wire to provide a 0.005" thickness to the glueline. The laps were clamped and cured in an oven at 150° C. for 60 minutes. The tensile strength of the laps after curing was 1620 psi.

EXAMPLE 2

A viscous liquid was prepared by mixing and warming 10.0 grams (0.087 equivalent) of a polyether triol (NIAX®LS490), and 10.0 grams (0.082 equivalent) of α, α, α', α'-tetramethyl-1,3-xylylene diisocyanate. The mixture was subsequently heated at 100° C. for 4 hours, and cooled to ambient temperature. The resulting viscous liquid was storage-stable at room temperature for six weeks.

The viscous liquid was applied to two cold-rolled steel laps as described in Example 1, except that the cure time at 150° C. was varied from 10 minutes to 40 minutes. The tensile strengths obtained are shown below:

| Cure Time (mins.) | Lap Shear Tensil Strength (psi) |
|---|---|
| 10 | 40 |
| 20 | 360 |
| 30 | 1020 |
| 40 | 1500 |

EXAMPLE 3

An isocyanate-terminated prepolymer was prepared by heating 120 grams (1.2 equivalents) of a trifunctional polycaprolactone (NIAX®PCP301), 312 grams (1.2 equivalents) of a difunctional polycaprolactone (NIAX®PCP200), and 600 grams (4.92 equivalents) of α, α, α'α'-tetramethyl-1,3-xylylene diisocyanate, at 90°-100° C. for 42 hours. The resulting prepolymer had an isocyanate content of 10.2%.

A paste was prepared by mixing 11.97 grams of the above prepolymer, 0.5 gram of a thickening agent (CABOSIL®MS), and 0.89 gram of glycerol to provide one equivalent of hydroxyl per equivalent of isocyanate group. The mixture was subsequently degassed under high vacuum to remove trapped gases.

The product was applied to two cold-rolled steel laps as described in Example 1, except that it was cured at 150° C. for 80 minutes. The tensile strength obtained was 2650 psi.

Although the present invention has been described with reference to certain preferred embodiments, it is apparent that modifications or changes may be made therein by those skilled in this art without departing from the scope and spirit of the present invention as defined by the appended claims.

What is claimed is:

1. A storage stable, one package heat curable polyurethane adhesive composition, said composition comprising:
   (a) a mixture of or a prepolymer adduct of:
      (i) a poly aliphatic isocyanate compound of the formula:

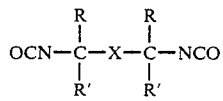

wherein R and R' are each, independently, selected from hydrogen, alkyl or substituted alkyl and X is a bridging means selected from aliphatic, cycloaliphatic, or aromatic groups, or a prepolymer adduct of said isocyanate compound possessing poly aliphatic isocyanate functionality; and
      (ii) a monomeric or polymeric compound containing a plurality of hydroxyl groups; wherein component (ii) is added in an amount so as to provide less than a stoichiometrically equivalent amount of hydroxyl groups to said aliphatic isocyanate groups present in (a), in admixture with
   (b) an amount of a curing agent comprising a monomeric or polymeric compound containing at least three hydroxyl groups, at least one of said hydroxyl groups being a secondary hydroxyl group, said curing agent being present in an amount sufficient to provide an approximately stoichiometrically equivalent amount of hydroxyl groups to said excess of aliphatic isocyanate groups in (a); and
   (c) optionally, an effective amount of an inert filler.

2. A polyurethane adhesive composition as recited in claim 1, wherein component (a)(ii) is present in an amount such that component (a) possesses an overall stoichiometric excess of aliphatic isocyanate groups over hydroxyl groups of from about 5% to about 15% by weight of the total aliphatic isocyanate content of (a) (i).

3. A polyurethane adhesive composition as defined in claim 1 wherein in curing agent component (b) not more than two of said hydroxyl groups are primary hydroxy.

4. A polyurethane adhesive composition as defined in claim 1 wherein component (a)(i) comprises α, α, α', α'-tetramethylxylylene diisocyanate.

5. A polyurethane adhesive composition as defined in claim 1, wherein component (a)(i) comprises a polymeric adduct of a poly aliphatic isocyanate compound and a hydroxyl-terminated polyether, said adduct having aliphatic isocyanate terminal groups.

6. A polyurethane adhesive composition as defined in claim 1, wherein component (a)(i) comprises a polymeric adduct of a poly aliphatic isocyanate compound and a hydroxyl-terminated polyester, said adduct having aliphatic isocyanate terminal groups.

7. A polyurethane adhesive composition as defined in claim 1, wherein said curing agent (b) is selected from the group consisting of glycerol, 1,2,6-hexanetriol, and polymeric polyol compounds containing secondary hydroxyl groups.

8. A polyurethane adhesive composition as defined in claim 1, wherein inert filler (c) is a fumed colloidal silica filler which is present in an amount of about 10 to about 60 parts by weight, based on the combined weight of (a) and (b).

9. A method for preparing a storage stable, one package, heat curable polyurethane coating composition, said method comprising:
   (a) forming a liquid mixture of a poly aliphatic isocyanate compound of the formula

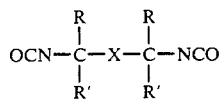

wherein R and R' are each, independently, selected from hydrogen, alkyl and substituted alkyl and X is a bridging means selected from divalent aliphatic, cycloaliphatic or aromatic groups, or a polymeric adduct of said aliphatic isocyanate compound possessing poly aliphatic isocyanate functionality, optionally in a suitable solvent;

(b) adding to (a), a liquid mixture of a monomeric or polymeric compound containing a plurality of hydroxyl groups, optionally in a suitable solvent, in an amount so as to provide less than a stoichiometrically equivalent amount of hydroxyl groups to the isocyanate groups present in (a) to provide a mixture or prepolymer containing from about 5% to about 15% by weight of a stoichiometric excess of aliphatic isocyanate equivalents over hydroxyl equivalents in said mixture or prepolymer;

(c) thereafter, adding a curing agent comprising a monomeric or polymeric compound containing at least three hydroxyl groups, at least one of which is a secondary hydroxyl group, in an amount sufficient to provide an approximately stoichiometrically equivalent amount of hydroxyl groups to said excess of aliphatic isocyanate groups in the liquid mixture of step (b); and (d) optionally, adding an effective amount of an inert filler to obtain a storage stable one package heat curable polyurethane adhesive composition.

10. A method as recited in claim 9, further including as step (e), the step of degassing the mixture of step (c) or (d) by heating said mixture at a temperature of about 70° to about 100° C. under a vacuum for a time sufficient to degas the composition.

11. An article of manufacture comprising a plurality of pieces each piece having at least a part of a surface portion in close proximity to another piece, and having an adhesive joint therebetween, said adhesive joint comprising a heat cured composition as defined in claim 1.

12. A method of bonding a plurality of articles comprising:

(a) providing a plurality of articles;

(b) applying a layer of heat curable polyurethane adhesive composition as defined in claim 1 to at least a portion of a surface of at least one of the articles;

(c) bringing at least two surfaces of at least two of said articles into close proximity so as to complete formation of a heat-curable adhesive joint therebetween; and (d) exposing the article of step (c) to elevated temperatures of about 100° to about 200° C. for a time sufficient to cure said adhesive composition.

* * * * *